(12) United States Patent
Mitsumoto et al.

(10) Patent No.: US 6,384,769 B1
(45) Date of Patent: May 7, 2002

(54) METHOD FOR MEASURING DISTANCES/SPEEDS OF PLURAL TARGETS AND RADAR APPARATUS, CAPABLE OF DISCRIMINATING MOVING TARGETS FROM STATIONARY TARGETS

(75) Inventors: Masashi Mitsumoto; Tetsuo Kirimoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/458,029

(22) Filed: Dec. 10, 1999

(30) Foreign Application Priority Data

Dec. 11, 1998 (JP) ............................................. 10-352761

(51) Int. Cl.$^7$ ............................................. G01S 13/42
(52) U.S. Cl. ....................... 342/109; 342/104; 342/115; 342/118; 342/128; 342/175; 342/192; 342/195; 342/196
(58) Field of Search ........................ 342/27, 28, 70–72, 342/104, 109–116, 118, 120–130, 159–164, 175, 192–197

(56) References Cited

U.S. PATENT DOCUMENTS

| 5,677,695 A | * | 10/1997 | Suzuki et al. ............... 342/109 |
| 5,731,778 A | * | 3/1998 | Nakatani et al. ............. 342/70 |
| 6,018,309 A | * | 1/2000 | Mitsumoto et al. ......... 342/109 |
| 6,097,331 A | * | 8/2000 | Matsugatani et al. ......... 342/70 |
| 6,121,917 A | * | 9/2000 | Yamada ....................... 342/128 |

FOREIGN PATENT DOCUMENTS

| JP | 6-214017 | 8/1994 |
| JP | 749378 | 2/1995 |
| JP | 755926 | 3/1995 |
| JP | 777575 | 3/1995 |
| JP | 7-98376 | 4/1995 |
| JP | 7-191133 | 7/1995 |

* cited by examiner

*Primary Examiner*—Bernarr E. Gregory

(57) ABSTRACT

The present invention discriminates between moving targets and stationary targets in order to measure distances and speeds of the targets without producing a false target. The invention transmits signals whose modulating frequencies ascend or descend to a target, and receives signals reflected from this target. A frequency spectrum of a beat signal of each target is detected during a modulating frequency ascent period and a modulating frequency descent period. The frequency spectrum of the modulating frequency ascent period and the frequency spectrum of the modulating frequency descent period are used to set a reference spectrum. The reference beat frequencies of either the moving targets or the stationary targets are detected based upon the reference spectrum. The beat frequencies of targets in the modulating frequency ascent and descent periods are used to form a combination seeking table, from which a component other than the reference beat frequencies of either the moving targets or the stationary targets are removed. The distances and speeds of the targets are calculated based upon the beat frequency components from the combination seeking means.

10 Claims, 10 Drawing Sheets

(a) MODULATING FREQUENCY ASCENT PERIOD

FIG. 4B

(b) MODULATING FREQUENCY DESCENT PERIOD

(a) MODULATING FREQUENCY ASCENT PERIOD

FIG. 9B

(b) MODULATING FREQUENCY DESCENT PERIOD

(a) MODULATING FREQUENCY ASCENT PERIOD

FIG. 10B (b) MODULATING FREQUENCY DESCENT PERIOD

FIG. 10C (C) : (a) − (b)

METHOD FOR MEASURING DISTANCES/SPEEDS OF PLURAL TARGETS AND RADAR APPARATUS, CAPABLE OF DISCRIMINATING MOVING TARGETS FROM STATIONARY TARGETS

BACKGROUND OF THE INVENTION

1. Field of the Invention

The present invention generally relates to a distance/speed measuring method for measuring distances/speeds of detected targets (objects), and also a radar apparatus with employment of this distance/speed measuring method. More specifically, the present invention is directed to such a distance/speed measuring method capable of detecting the targets to measure relative distances and relative speeds between these targets by using a frequency-modulated continuous wave (FMCW), and further directed to a radar apparatus using this distances/speeds measuring method.

2. Description of the Related Art

Radar systems with employment of frequency-modulated continuous waves (FMCWs) are known in this technical field. In this known radar system, a beat frequency "$F_{up}$" of a modulating frequency ascent period and another beat frequency "$F_{dn}$" of a modulating frequency descent period are measured as to a target (object). In this case, the beat frequency "$F_{up}$" of the modulating frequency ascent period and the beat frequency "$F_{dn}$" of the modulating frequency descent period are expressed by the below-mentioned formulae (1) and (2):

[formula 1]

$$F_{up} = (2B/CT) \cdot R - 2/\lambda \cdot V \equiv Fr - Fv \quad (1),$$

and $$F_{dn} = -(2B/CT) \cdot R - 2/\lambda \cdot V \equiv -Fr - Fv \quad (2).$$

As a result, a target relative distance "R" may be calculated from $F_{up} - F_{dn}$, and also a target relative speed "V" may be calculated from $F_{up} + F_{dn}$ based upon the following formulae (3) to (6). It should be noted that in these formulae, symbol "B" shows a frequency modulation width; symbol "C" denotes a light velocity; symbol "T" represents a modulation period; symbol "$\lambda$" shows a wavelength of a radar carrier wave; symbol "Fr" denotes a distance frequency; and also symbol "Fv" indicates a speed frequency:

[formula 2]

$$Fr = (F_{up} - F_{dn})/2 \quad (3),$$

$$Fv = -(F_{up} + F_{dn}/2) \quad (4),$$

$$R = (CT/2B) \cdot Fr \quad (5),$$

and $$V = (\lambda/2) \cdot Fv \quad (6).$$

In such a case that the targets are present, combinations among beat frequencies "$F_{up}(n)$" and the beat frequencies "$F_{dn}(m)$" corresponding to the respective targets must be sought as to the beat frequencies $F_{up}(i)$ (i=1 to N) which are detected in the modulating frequency ascent period, and further as to the beat frequencies $F_{dn}(i)$ (i=1 to M) which are detected in the modulating frequency descent period.

For example, in Japanese Patent Application Laid-open No Hei-7-49378 and Japanese Patent Application Laid-open No. Hei7-55926, with respect to the frequency spectra of the reception signals in each of the periods, which are calculated so as to obtain the beat frequencies, the combinations of the beat frequencies are determined by utilizing the relative amounts as to the spectrum shape near peaks. Also, in Japanese Patent Application Lain-open No. Hei-7-77575, as to the frequency spectrum calculated to obtain beat frequencies, the combinations of the beat frequencies are determined by utilizing the magnitude order of the respective power levels of the peaks.

However, in any of the above-explained conventional radar systems, the combinations of the beat frequencies are erroneously determined due to the adverse influences, namely the variations in the moving (mobile) target signals, and also the unnecessary signal components such as the noise signals. As a result, these erroneous combinations are outputted as the false targets.

In this case, if such a discrimination can be carried out between a target which has no speed difference with respect to this radar system and may be observed as a stationary target from this radar system (will be simply abbreviated as a "stationary target" hereinafter), and another target which has a speed difference with respect to the radar system and may be observed as a moving target (mobile object) from this radar system (will be simply abbreviated as a "moving target" hereinafter) among targets, then it is possible to reduce the appearance of the false targets caused by this erroneous combination.

Figure 9A:
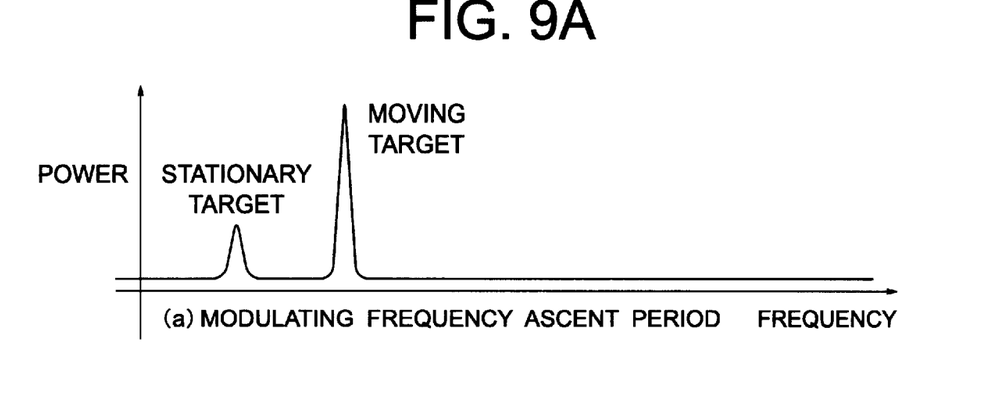
FIG. 9A to FIG. 9C are explanatory diagrams explaining the frequency spectrum in the conventional radar system.
Figure 9B:
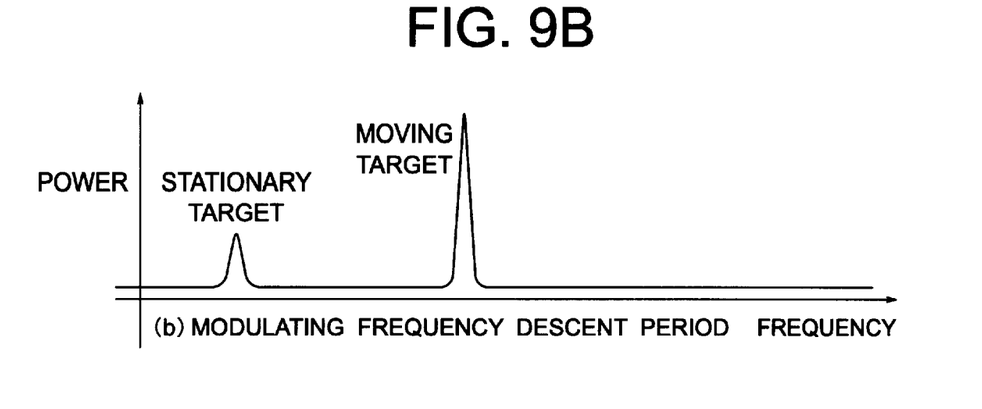
Figure 9C:
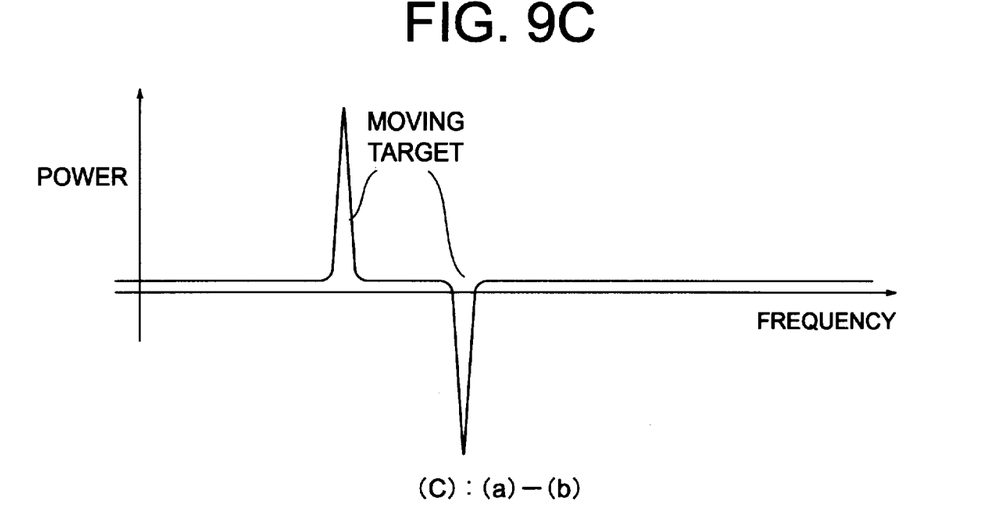

For example, in Japanese Patent Application Laid-open No. 6-214017, Japanese Patent Application Laid-open No. 7-98376, and Japanese Patent Application Laid-open No. 7-191133, the power difference (see FIG. 9C) is calculated between the frequency spectrum of the modulating frequency ascent period (see FIG. 9A) and the frequency spectrum of the modulating frequency decent period (see FIG. 9B). Then, such stationary targets whose frequencies become equal to each other both in the modulating frequency ascent and descent periods are canceled, and only the moving targets are employed so as to be sought as the combinations.

Figure 10A:
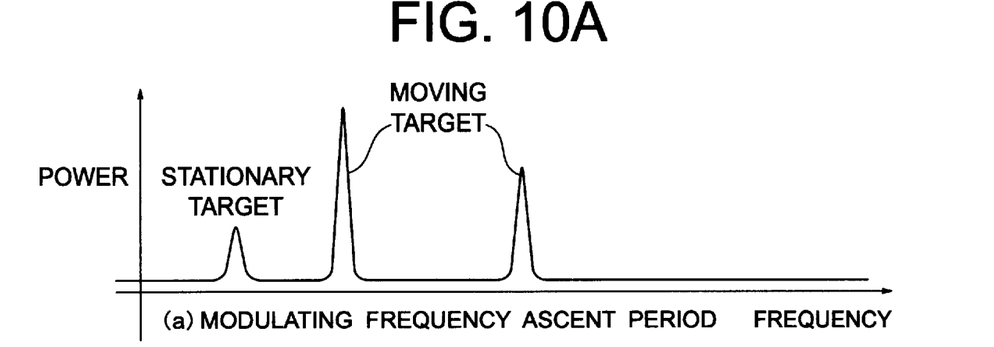
FIG. 10A to FIG. 10C are explanatory diagrams explaining the frequency spectrum in the conventional radar system.
Figure 10B:
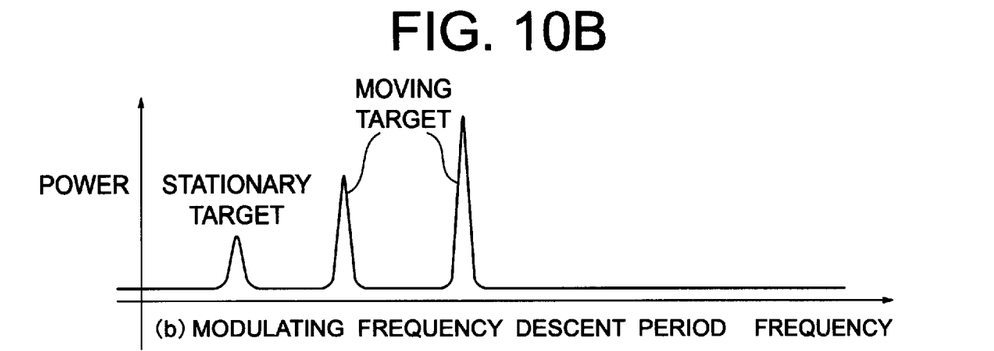
Figure 10C:
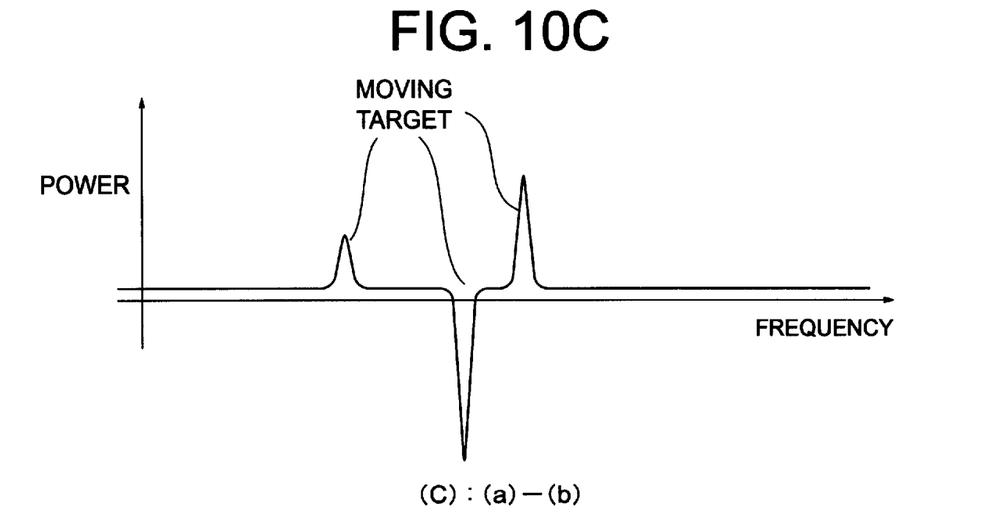

However, when moving targets are employed as the targets to be sought, there is a certain case that a beat frequency (see FIG. 10A) in a modulating frequency ascent period of a certain moving target becomes equal to another beat frequency (See FIG. 10B) in a modulating frequency descent period of another moving target. Accordingly, there is a problem in that no final target detection output can be produced (see FIG. 10C).

SUMMARY OF THE INVENTION

The present invention has been made to solve the above-explained problem, and therefore, has an object to provide a target distance/speed measuring method, and a radar apparatus with employment of such a target distance/speed measuring method capable of measuring a distance and a speed between the respective targets while discriminating a moving target from a stationary target among targets.

A target distance/speed measuring method, according to an aspect of the present invention, is characterized in that in such a method for measuring distances and speeds of each of targets by employing a frequency-modulated continuous wave based upon a seeking result of combinations between beat frequencies detected for the targets in a modulating frequency ascent period and the beat frequencies detected in a modulating frequency descent period with respect to each of the targets, since moving targets are discriminated from stationary targets by using reference specific frequencies which correspond to a detection result with respect to a reference spectrum obtained as a calculation result between a frequency spectrum in a modulating frequency ascent period and a frequency spectrum in a modulating frequency descent period, the distances and the speeds of the respective targets are measured while the targets are discriminated as the moving targets and the stationary targets.

Also, the target distance/speed measuring method is characterized in that the specific frequencies equal to a detection result with respect to a reference spectrum which has been obtained during one preceding measuring operation of a presently measured modulating frequency ascent period and a presently measured modulating frequency descent period are utilized as a reference with respect to a repeated modulating frequency ascent period and a repeated modulating frequency descent period.

Also, the target distance/speed measuring method is characterized in that the reference spectrum is obtained from an absolute value of a power difference between a frequency spectrum of a modulating frequency ascent period and a frequency spectrum of a modulating frequency descent period.

A radar apparatus, according to another aspect of the present invention, is characterized by comprising: transmitting means for transmitting a transmission wave of a continuous wave whose modulating frequency ascends or descends to a target; receiving means for receiving a reception wave reflected from the target; beat signal producing means for producing a beat signal having a frequency corresponding to a frequency difference between the transmission wave and the reception wave reflected from the target; fast Fourier-transform processing means for acquiring a frequency spectrum of the beat signal; beat frequency detecting means for detecting the frequencies of the targets in both a modulating frequency ascent period and a modulating frequency descent period; discrimination target reference spectrum setting means for inputting thereinto a frequency spectrum of a modulating frequency ascent period and a frequency spectrum of a modulating frequency descent period so as to set a reference spectrum employed when the moving targets are discriminated from the stationary targets; discrimination target beat frequency detecting means for detecting the reference beat frequencies of either the moving targets or the stationary targets based upon the reference spectrum; combination seeking means for entering thereinto the beat frequencies of the target in the modulating frequency ascent period and the modulating frequency descent period from the beat frequency detecting means so as to form a combination seeking table, and for removing from a seeking object, a component other than the reference beat frequencies of either the moving targets or the stationary targets from the discrimination target beat frequency detecting means within the combination seeking table, to output; and distance/speed calculating means for calculating a distance of the target and a speed thereof based upon the beat frequency from the combination seeking means.

The radar apparatus is characterized by further comprising: a discrimination target reference beat frequency storing unit connected between the discrimination target beat frequency detecting means and the combination seeking means, for storing thereinto the reference beat frequencies of either the moving targets or the stationary targets detected by the discrimination target beat frequency detecting means; and for outputting to the combination seeking means the reference beat frequencies which have been obtained during one preceding measuring operation of a presently measured modulating frequency ascent period and a presently measured modulating frequency descent period with respect to a repeated modulating frequency ascent period and a repeated modulating frequency descent period.

BRIEF DESCRIPTION OF THE DRAWINGS

For a better understanding of the present invention, reference is made of a detailed description to be read in conjunction with the accompanying drawings, in which.

DETAILED DESCRIPTION OF THE PREFERRED EMBODIMENTS

Referring now to drawings, various preferred embodiments of the present invention will be described.

ARRANGEMENT OF FIRST RADAR APPARATUS

Figure 1:
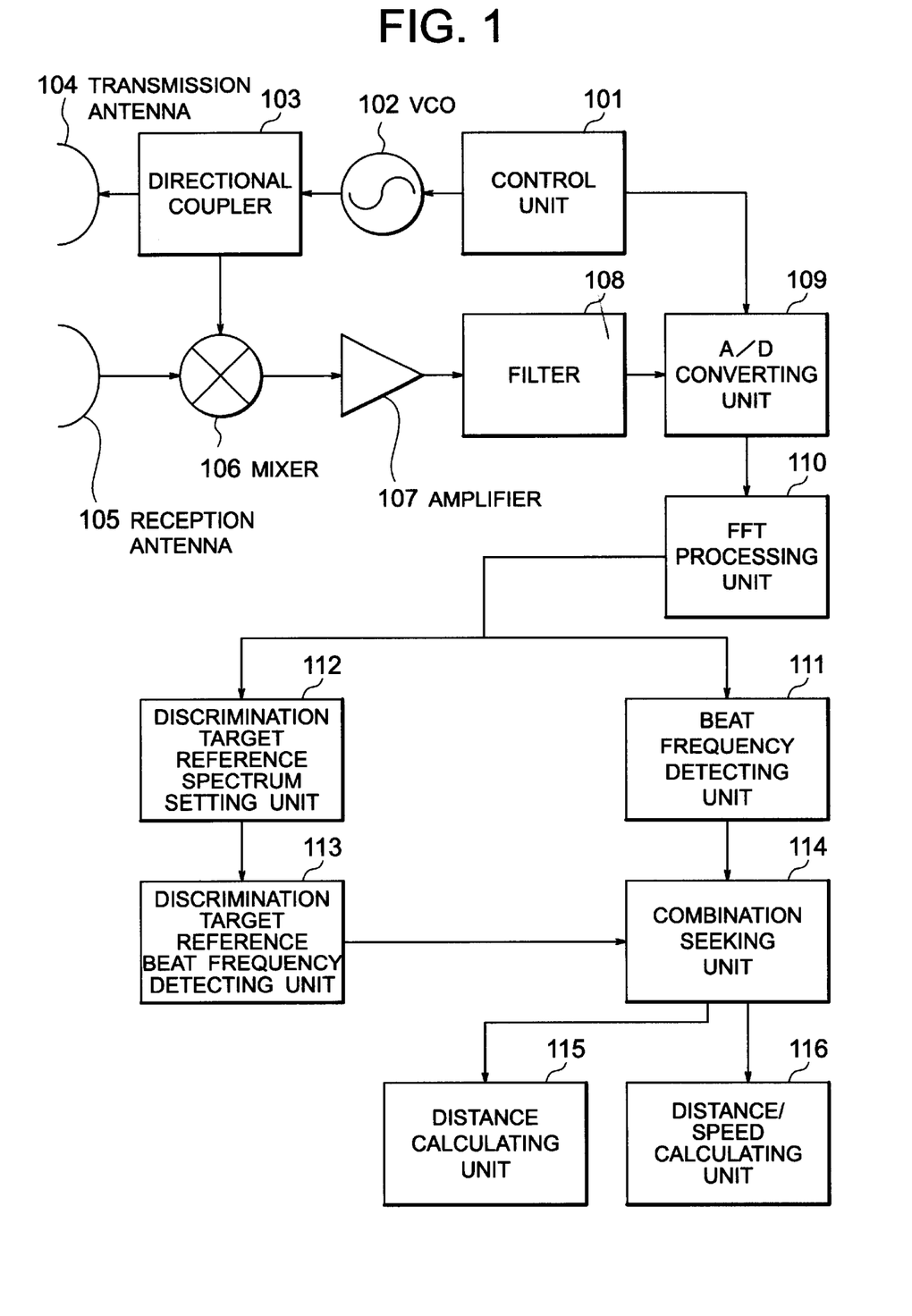
FIG. 1 is a schematic block diagram indicating an arrangement of a radar apparatus according to an embodiment mode 1 of the present invention.

FIG. 1 schematically shows an arrangement of a radar apparatus according to an embodiment mode 1 of the present invention.

In this drawing, reference numerals 101 to 104 constitute a transmitting means. Reference numeral 101 shows a control unit, reference numeral 102 indicates a voltage-controlled oscillator (VCO); reference numeral 103 represents a directional coupler, and reference numeral 104 denotes a transmission antenna. Also, reference numeral 105 shows a reception antenna which constitutes a reception means, reference numeral 106 shows a mixer which constitutes a beat signal producing means, reference numeral 107 represents an amplifier, reference numeral 108 denotes a filter, reference numeral 109 represents an analog-to-digital (A/D) converter, and reference numeral 110 is a fast Fourier transform (FFT) processing unit. Furthermore, reference numeral 111 shows a beat frequency detecting unit, reference numeral 112 represents a discrimination target reference spectrum setting unit, reference numeral 113 indicates a discrimination target reference beat frequency detecting unit, reference numeral 114 shows a combination seeking unit, reference numeral 115 represents a distance calculating unit, and also reference numeral 116 is a distance/speed calculating unit.

DISTANCE/SPEED MEASURING METHOD OF FIRST RADAR APPARATUS

Figure 2:
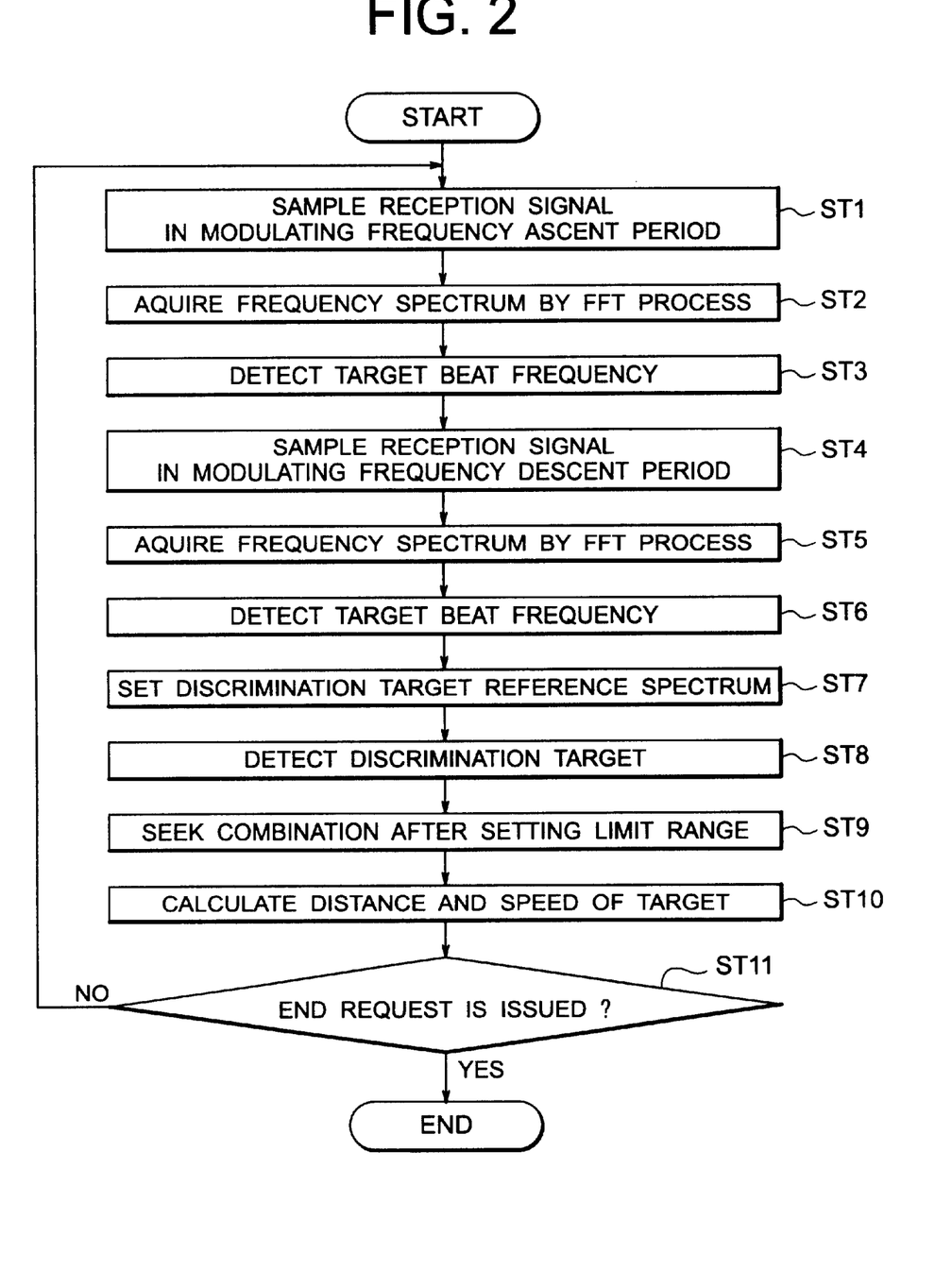
FIG. 2 is a flow chart describing a processing operation of a distance/speed measuring method of targets according to the embodiment mode 1 of the present invention.

FIG. 2 is a flow chart describing a method for measuring a distance and a speed (velocity) of a target executed in the radar apparatus of FIG. 1. That is, the radar apparatus measures the distance of the target and the speed thereof in accordance with this measuring process operation.

Figure 3:
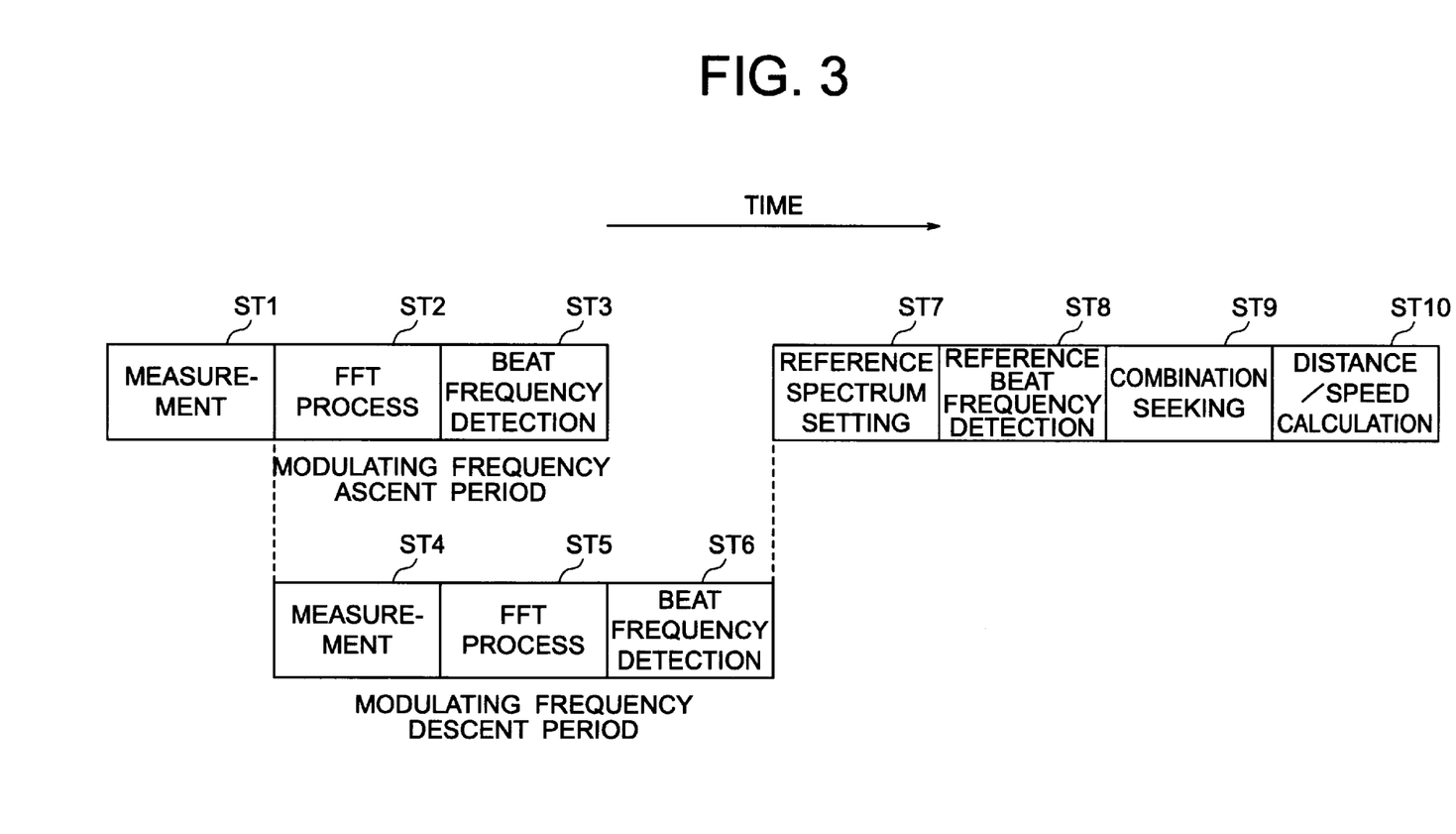
FIG. 3 is an explanatory diagram explaining the processing operation of the distance/speed measuring method for the targets in accordance with a time sequential manner in the embodiment mode 1 of the present invention.

Furthermore, FIG. 3 is an explanatory diagram explaining a measuring process operation in accordance with a time sequential manner so as to explain in detail the radar operation of FIG. 2.

Referring now to these drawings, the target distance/speed measuring operation will be described.

First, at a step ST1 of FIG. 2, the VCO 102 is controlled by the control unit 101 of FIG. 1 in order that the modulating frequency is increased to produce and then output a transmission wave. The transmission wave outputted from the VCO 102 is inputted into the directional coupler 103. A portion of this transmission wave is inputted to the transmission antenna 104, and the remaining portion thereof is inputted to the mixer 106.

The transmission wave which is radiated from the transmission antenna 104 to space is reflected from a target. This target is separated in a distance "R" from the transmission antenna 104, and is moving at a speed "V". Then, the reflected transmission wave is received as a reception wave by the reception antenna 105. Both the reception wave received by the reception antenna 105 and the transmission wave derived from the directional coupler 103 are inputted into the mixer 106, and then the mixed signal waves become such a beat signal having a frequency corresponding to a difference between the frequency of the transmission wave and the frequency of the reception wave. This beat signal is amplified by the amplifier 107, and unnecessary high frequency components are removed from the amplified beat signal by the filter 108. Thereafter, the filtered beat signal is digitally sampled by the A/D converter 109 in fit to the modulating period of the VCO 102 under control of the control unit 101.

Subsequently, at a step ST2 of FIG. 2, the FFT processing unit 110 of FIG. 1 processes the digitally sampled data derived from the A/D converter 109 to acquire a frequency spectrum of the beat signal.

At a step ST3, the beat frequency detecting unit 111 enters thereinto the frequency spectrum acquired at the previous step ST2, and executes, for example, a peak search and a CFAR (constant false alarm rate) detecting process so as to detect the beat frequencies $F_{up}(i)$ (i=1 to N) of the targets in a modulating frequency ascent period.

At a next step ST4, the VCO 102 produces such a transmission wave whose modulating frequency descends under control of the control unit 101 in a similar manner to the above step ST1. Under control of this control unit 101, the directional coupler 103, the transmission antenna 104, the reception antenna 105, the mixer 106, the amplifier 107, the filter 108, and the AID converter 109 are operated, so that a beat signal of the modulating frequency descent period is digitally sampled.

At a step ST5, the FFT processing unit 110 is operated to obtain a frequency spectrum of the beat signal in a similar manner to the above step ST2.

Similar to the above step ST3, the beat frequency detecting unit 111 is operated to detect the beat frequencies $F_{dn}(j)$ (j=1 to M) of the target in the modulating frequency descent period at a step ST6.

As shown in FIG. 3, the measurement operation defined at the step ST1 and the measurement operation defined at the step ST4 require different time instants. However, after the measurement operation defined at the step ST4 has been carried out, both the process operations defined from the step ST2 to the step ST3 and the process operations defined from the step ST5 to the step ST6 can be carried out in a parallel manner.

At a step ST7, the discrimination target reference spectrum setting unit 112 enters thereinto both the frequency spectrum of the modulating frequency ascent period obtained at the step ST2 and the frequency spectrum of the modulating frequency descent period obtained at the step ST5. Then, this discrimination target reference spectrum setting unit 112 sets a reference spectrum which is employed when the moving target (mobile target) and the stationary target are discriminated from each other.

Figure 4A:
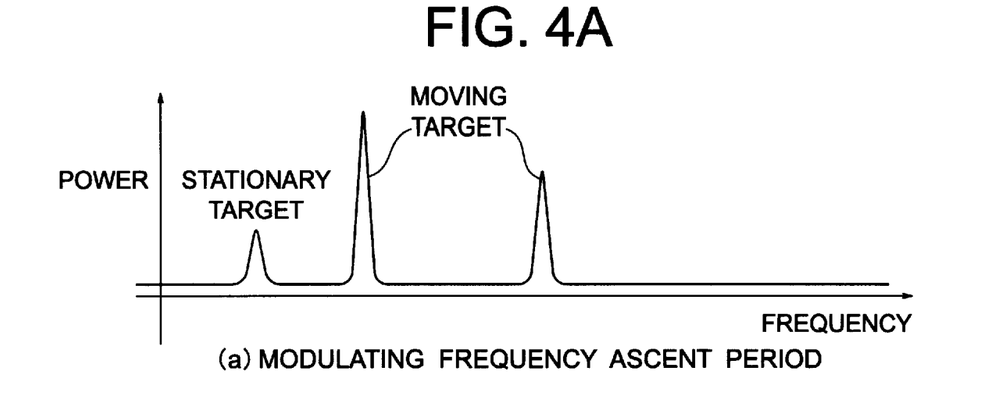
FIG. 4A to FIG. 4C are explanatory diagrams explaining a frequency spectrum of the embodiment mode 1 of the present invention.
Figure 4B:
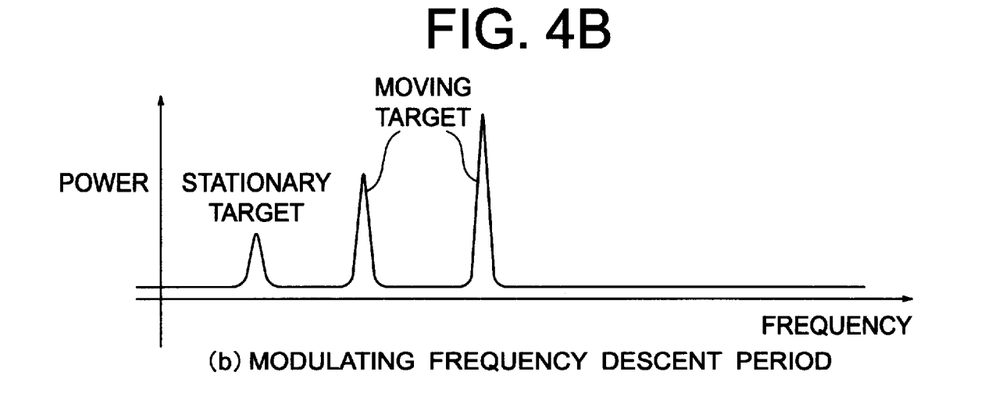
Figure 4C:
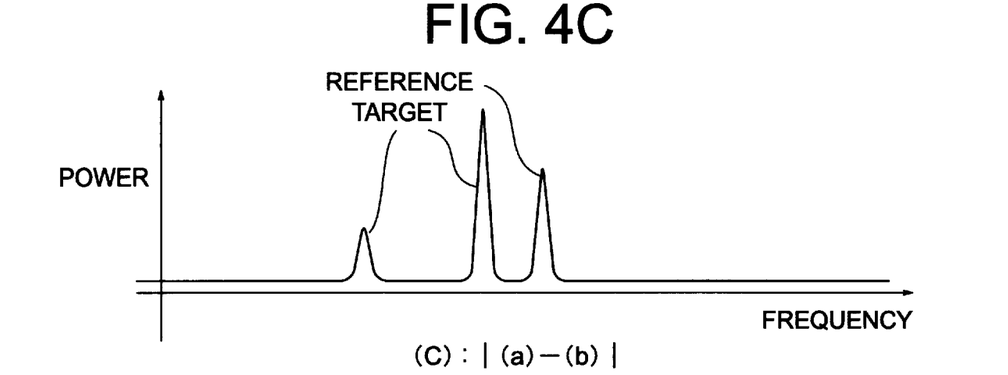

This reference spectrum is obtained, for example, from an absolute value (see FIG. 4C) of a power difference between a frequency spectrum (see FIG. 4A) of a modulating frequency ascent period and a frequency spectrum (see FIG. 4B) of a modulating frequency decent period, as represented in FIG. 4A to FIG. 4C, assuming that this reference spectrum does not contain the signal component of the stationary target (otherwise, the mobile target).

At a step ST8, the discrimination target reference beat frequency detecting unit 113 inputs thereinto the reference spectrum acquired at the step ST7 so as to detect the reference beat frequencies $F_{rf}(k)$ (k=1 to L) of the moving targets (or stationary targets) by executing, for instance, the peak search or the CFAR (constant false alarm rate) detecting process in a similar manner as defined at the previous steps ST3 and ST6.

Figure 5:
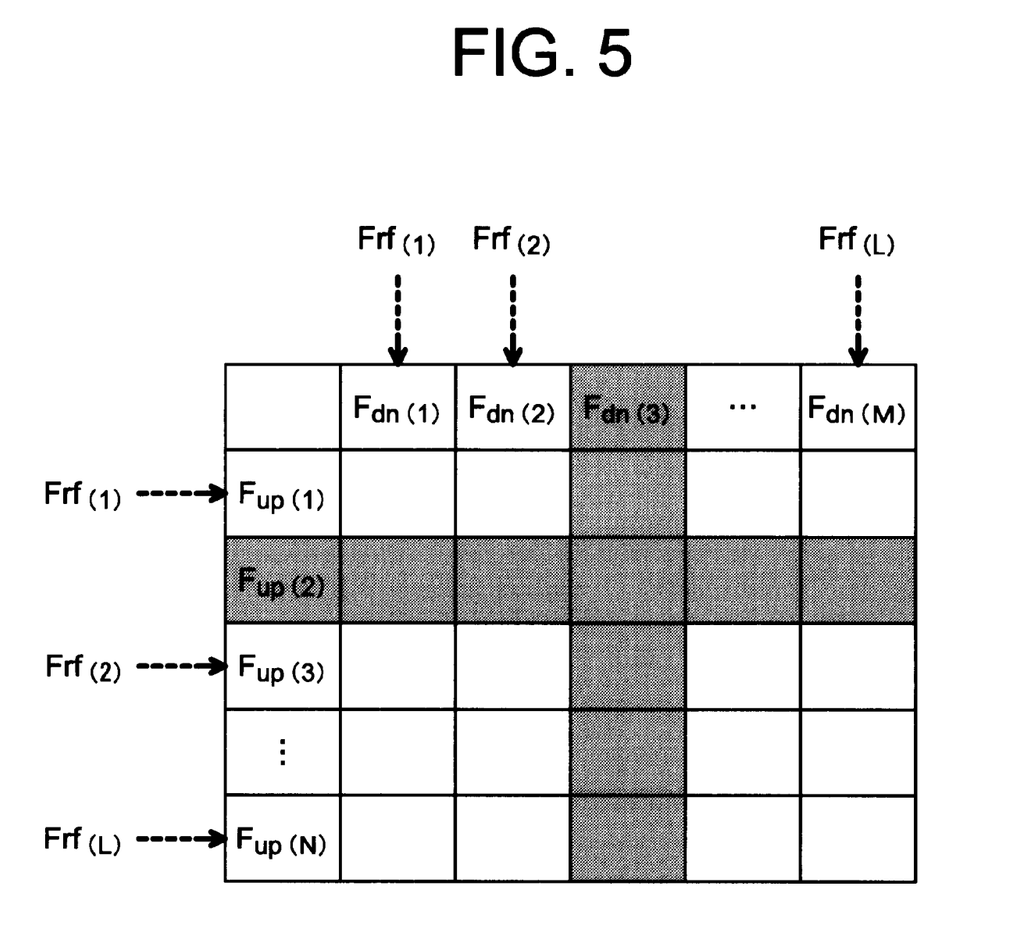
FIG. 5 is an explanatory diagram explaining a table employed in a combination seeking operation executed in the embodiment mode 1 of the present invention.

At a step ST9, the combination seeking unit 114 forms a combination seeking table as indicated in FIG. 5 by inputting both the beat frequencies $F_{up}(i)$ (i=1 to N) of the targets in the modulating frequency ascent period detected at the step ST3 and the beat frequencies $F_{dn}(j)$ (j=1 to M) of the targets in the modulating frequency descent period detected at the step ST6. Thereafter, this combination seeking unit 114 inputs thereinto the reference beat frequencies $F_{rf}(k)$ (k=1 to L) of the moving targets (or stationary targets) detected at the step ST8 in order to remove from the seeking object, either a row component or a column component except for the reference beat frequencies which are meshed in FIG. 5 within the combination seeking table. Then, the combination seeking unit 114 outputs the removed result to the distance calculating unit 115. As a consequence, since the combination seeking unit 114 never erroneously combines the stationary targets with the moving targets in each of the modulating frequency ascent/descent periods, a total number of occurrences of the false targets can be reduced.

As to such beat frequencies within the seeking range, which are not meshed and are left in FIG. 5, for instance, these remaining beat frequencies are rearranged based upon the magnitude order of electric power to determine proper combinations. Then, the combination seeking unit 114 outputs these properly determined combinations to the distance/speed calculating unit 116.

At a step ST10, the distance calculating unit 115 calculates a target relative distance "R" by using the inputted beat frequencies based on either the formula (1) or the formula (2), assuming now that V=0. Also, the distance/speed calculating unit 116 calculates both a target relative distance "R" and a target relative speed "V" by using the inputted beat frequencies based upon the formulae (3) to (6).

At a step ST11, the control unit 101 monitors as to whether or not an end request is issued by, for example, an operation by an operator. When the end request is not yet issued from the operator, the process operation is advanced to the step ST1 at which the next measuring operation is carried out. To the contrary, when such an end request is issued from the operator, this process operation is accomplished.

ARRANGEMENT OF SECOND RADAR APPARATUS

Figure 6:
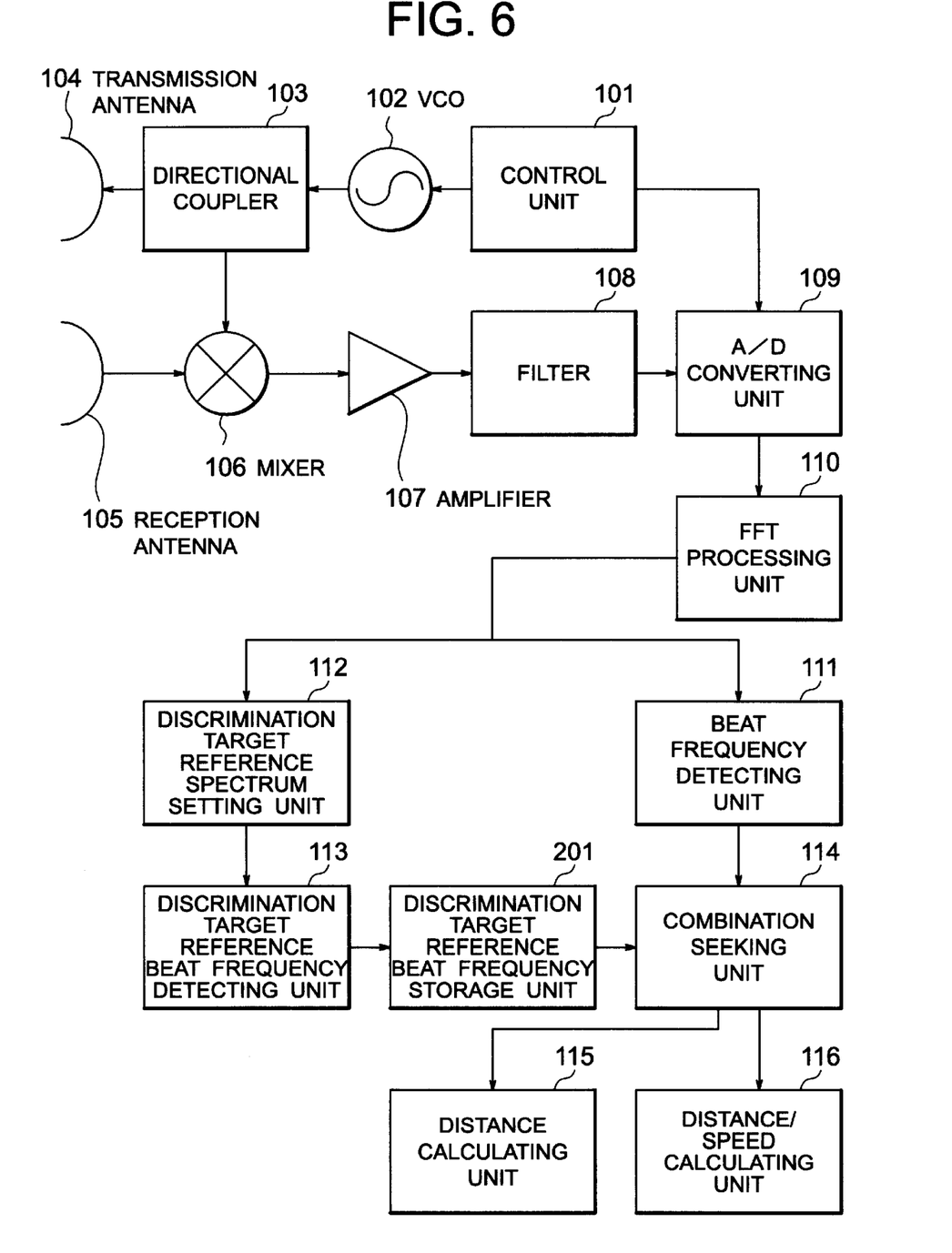
FIG. 6 is a schematic block diagram indicating an arrangement of a radar apparatus according to an embodiment mode 2 of the present invention.

FIG. 6 schematically shows an arrangement of a radar apparatus according to an embodiment mode 2 of the present invention.

It should be noted that the same reference numerals shown in the embodiment mode 1 of FIG. 1 will be employed as those for indicating the same, or similar units of the embodiment mode 2, and descriptions thereof are omitted. As a new reference numeral, reference numeral 201 shows a discrimination target reference beat frequency storing unit connected between the discrimination target beat frequency detecting unit 113 and the combination seeking unit 114. The discrimination target reference beat frequency storing unit 201 stores thereinto the reference beat frequencies of either the mobile targets (moving targets) or the stationary targets, which is detected by the discrimination target beat frequency detecting unit 113. Then, the discrimination target beat frequency storing unit 201 outputs to the combination seeking unit 114, such the reference beat frequencies which have been obtained during a modulating frequency ascent period and a modulating frequency descent period, namely one preceding period to the presently measured modulating frequency ascent/descent periods with respect to a repeated modulating frequency ascent period and a repeated modulating frequency descent period.

Figure 7:
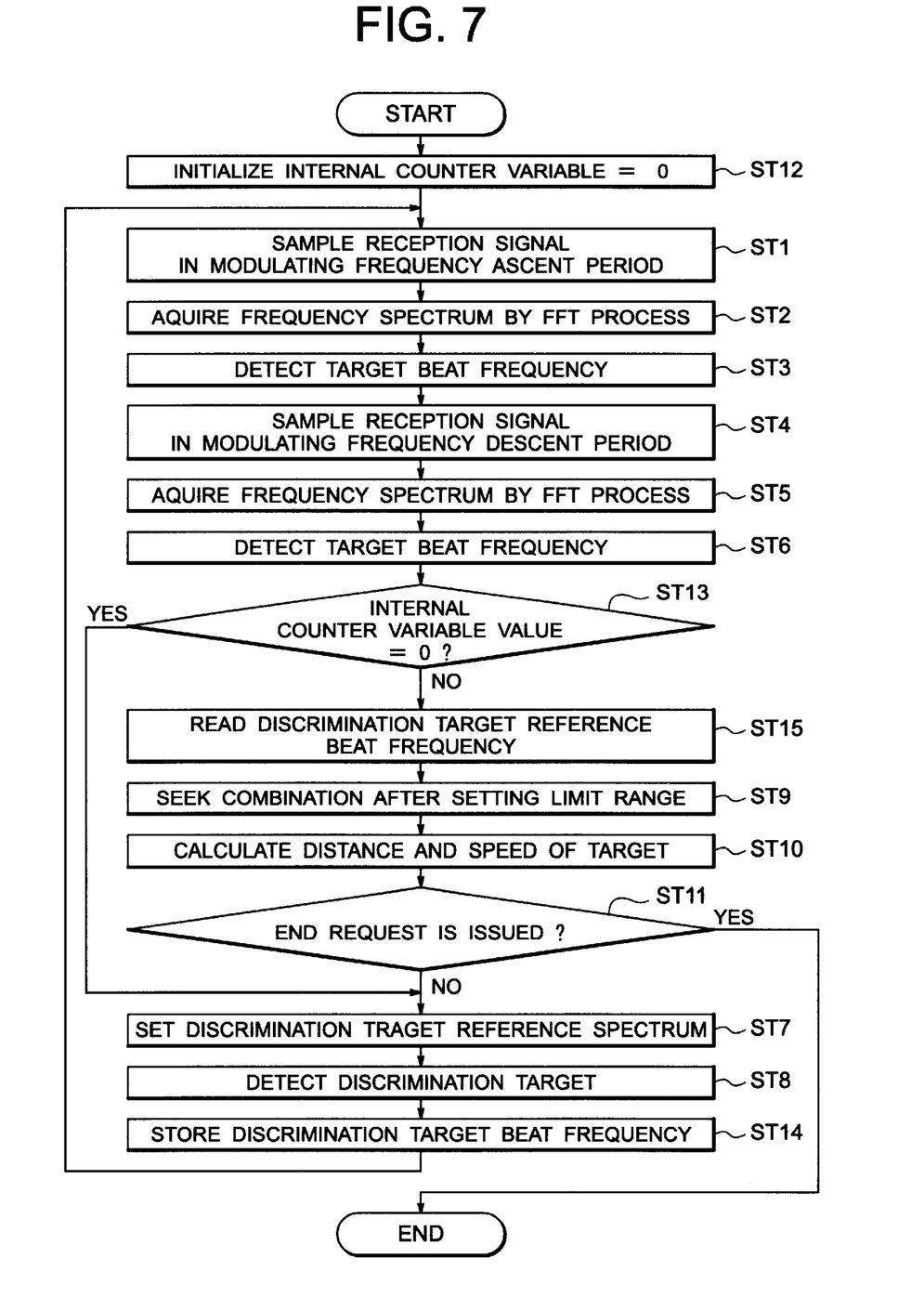
FIG. 7 is a flow chart describing a processing operation of a distance/speed measuring method of the targets according to the embodiment mode 2 of the present invention.

FIG. 7 is a flow chart describing a process operation of a measuring sequence executed in the radar apparatus shown in FIG. 6. It should also be noted that the same reference numerals indicated in the embodiment mode 1 of FIG. 2 will be employed as those for denoting the same, or similar elements of the embodiment mode 2 of FIG. 7, and descriptions thereof are omitted.

Figure 8:
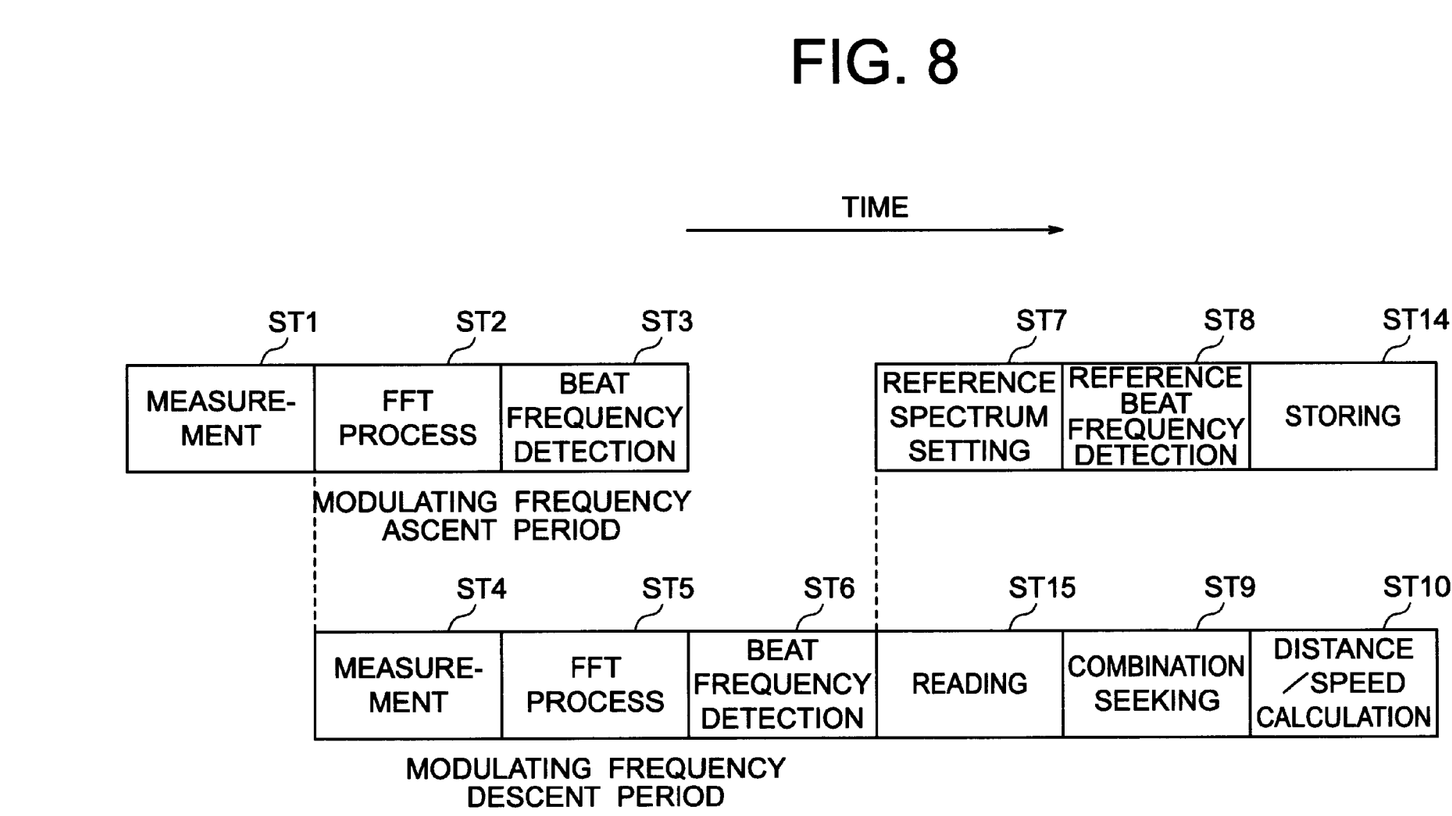
FIG. 8 is an explanatory diagram explaining the processing operation of the distance/speed measuring method for the targets in accordance with a time sequential manner in the embodiment mode 2 of the present invention.

Furthermore, FIG. 8 is an explanatory diagram explaining a measuring process operations in accordance with a time sequential manner so as to explain the radar apparatus of FIG. 7.

DISTANCE/SPEED MEASURING METHOD OF SECOND RADAR APPARATUS

Referring now to these drawings, the distance/speed measuring operation of the radar apparatus according to the embodiment mode 2 will be described.

When this measuring operation is commenced, the radar apparatus initializes a counter variable value contained in the control unit 101 of FIG. 6 at a step ST12 of FIG. 7.

Subsequently, in this radar apparatus, process operations defined from the step ST1 to the step ST6 are carried out in a similar manner to those of the embodiment mode 1, and the respective structural elements are operated.

At a step ST13, the control unit 101 compares the value of the internal counter variable value with zero. When this variable value is equal to zero, the process operation is advanced to a step ST7. To the contrary, when this variable value is not equal to zero, the process operation is advanced to a step ST15.

At this step ST7 and the subsequent step ST8, process operations are carried out in a similar manner to those of the embodiment mode 1, and the respective structural elements are operated.

Subsequently, at a step ST14, under control of the control unit 101, the discrimination target reference beat frequency storing unit 201 stores thereinto the reference beat frequency $F_{rf}$ (k) (k=1 to L) detected at the previous step ST8. Thereafter, the process operations advanced to the step ST1 at which the next measuring operation by the radar apparatus of the embodiment mode 2 is commenced under control of the control unit 101.

On the other hand, at the step ST15, the combination seeking unit 114 reads out the reference beat frequency $F_{rf}$ (k) (k=1 to L) stored in the discrimination target reference beat frequency storing unit 201, and then the process operation is advanced to a further step ST9.

At this step ST9 and the subsequent steps ST10 and ST11, process operations are carried out in a similar manner to those of the embodiment mode 1, and the respective structural elements are operated.

As indicated in FIG. 8, at the step ST15, the combination seeking unit 114 reads out the processed results obtained at the step ST7 and the step ST8 and then stored at the previous step ST14, while the next measurement is carried out. This combination seeking unit 114 utilizes the read results in the combination seeking operation of the step ST9. As a result, since the process operations defined from the step ST7 to the steps ST8 and ST14 and also the process operations defined from the step ST15 to the steps ST9 and ST10 can be performed in a parallel manner, the process operations can be readily carried out in real time.

As previously described in detail, in accordance with the target distance/speed measuring method and the radar apparatus, according to the present invention, the targets can be discriminated as the moving targets and the stationary targets, so that the distances as well as the speeds of the respective targets can be measured.

Also, the measurement process operations can be easily carried out in real time.

What is claimed is:

1. A radar apparatus comprising:

transmitting means for transmitting a transmission wave of a continuous wave whose modulating frequency ascends or descends to a target;

receiving means for receiving a reception wave reflected from said target;

beat signal producing means for producing a beat signal having a frequency corresponding to a frequency difference between said transmission wave and said reception wave reflected from said target;

fast Fourier-transform processing means for acquiring a frequency spectrum of said beat signal;

beat frequency detecting means for detecting the frequencies of the targets in both a modulating frequency ascent period and a modulating frequency descent period;

discrimination target reference spectrum setting means for inputting thereinto a frequency spectrum of a modulating frequency ascent period and a frequency spectrum of a modulating frequency descent period so as to set a reference spectrum employed when a moving target is discriminated from a stationary target;

discrimination target beat frequency detecting means for detecting the reference beat frequencies of either the moving targets or the stationary targets based upon said reference spectrum;

combination seeking means for entering thereinto the beat frequencies of the targets in the modulating frequency ascent period and the modulating frequency descent period from said beat frequency detecting means so as to form a combination seeking table, and for removing from a seeking object, a component other than the reference beat frequencies of either the moving targets or the stationary targets from said discrimination target beat frequency detecting means within said combination seeking table, to output; and distance/speed calculating means for calculating the distance of the targets and the speeds thereof based upon the beat frequencies from said combination seeking means.

2. A radar apparatus as claimed in claim 1, further comprising:

a discrimination target reference beat frequency storing unit connected between said discrimination target beat frequency detecting means and said combination seeking means, for storing thereinto the reference beat frequencies of either the moving targets or the stationary targets detected by said discrimination target beat frequency detecting means; and for outputting to the combination seeking means the reference beat frequencies which have been obtained during one preceding measuring operation of a presently measured modulating frequency ascent period and a presently measured modulating frequency descent period with respect to a repeated modulating frequency ascent period and a repeated modulating frequency descent period.

3. A method for measuring distances and speeds of a target, said method comprising:

transmitting to a target a wave having a modulating frequency ascent period and a modulating frequency descent period;

receiving from the target a reflected wave having a modulating frequency ascent period and a modulating frequency descent period;

mixing the transmitted and received waves having the modulating frequency ascent periods to produce a first beat signal;

mixing the transmitted and received waves having the modulating frequency descent periods to produce a second beat signal;

processing the transmitted and received waves having the modulating frequency ascent and the modulating frequency descent periods to produce a third beat signal;

identifying whether the target is a stationary target or a moving target using the first, second, and third beat signals; and obtaining the distance to the target.

4. The method according to claim 3 wherein said identifying is performed based on said third beat signal being obtained during a measuring operation preceding producing of said first and second signals.

5. The method according to claim 3 wherein said third beat signal is obtained from an absolute value of a power difference between a frequency spectrum of a modulating frequency ascent period and a frequency spectrum of a modulating frequency descent period.

6. The method according to claim 3, further comprising obtaining the relative speed of the target.

7. An apparatus for measuring distances and speeds of a target, said apparatus comprising:

a transmitter arranged to transmit to a target a wave having a modulating frequency ascent period and a modulating frequency descent period;

a receiver arranged to receive from the target a reflected wave having a modulating frequency ascent period and a modulating frequency descent period;

at least one mixer arranged to mix the transmitted and received waves having the modulating frequency ascent periods to produce a first beat signal, said at least one mixer also arranged to mix the transmitted and received waves having the modulating frequency descent periods to produce a second beat signal; and at least one processor arranged to process the transmitted and received waves having the modulating frequency ascent and the modulating frequency descent periods to produce a third beat signal, said at least one processor arranged to identifying whether the target is a stationary target or a moving target using the first, second, and third beat signals; and said at least one processor arranged to obtain the distance to the target.

8. The method according to claim 7 wherein said at least one processor identifies whether the target is a stationary target or a moving target based on said third beat signal being obtained during a measuring operation preceding producing of said first and second signals.

9. The method according to claim 7 wherein said at least one processor produces said third beat signal based on the absolute value of a power difference between a frequency spectrum of a modulating frequency ascent period and a frequency spectrum of a modulating frequency descent period.

10. The method according to claim 7, wherein said at least one processor is also operatively arranged to obtain the relative speed of the target.

* * * * *